United States Patent
Sakamoto

(10) Patent No.: US 7,312,840 B1
(45) Date of Patent: Dec. 25, 2007

(54) ACTIVE MATRIX LIQUID CRYSTAL DISPLAY WITH 5MM CONTACT HOLE IN COLOR FILTER AND MANUFACTURING METHOD THEREOF

(75) Inventor: Michiaki Sakamoto, Tokyo (JP)

(73) Assignees: NEC Corporation, Tokyo (JP), part interest; NEC LCD Technologies, Ltd., Kawasaki, Kanagawa (JP), part interest ( * ) Notice: Subject to any disclaimer, the term of this patent is extended or adjusted under 35 U.S.C. 154(b) by 0 days.

(21) Appl. No.: 09/585,472

(22) Filed: Jun. 2, 2000

(30) Foreign Application Priority Data

Jun. 4, 1999 (JP) .............................. 1999/157330

(51) Int. Cl.
*G02F 1/1335* (2006.01)
(52) U.S. Cl. ..................................... 349/106; 349/139
(58) Field of Classification Search ......... 349/104–108
See application file for complete search history.

(56) References Cited

U.S. PATENT DOCUMENTS

| | | | | |
|---|---|---|---|---|
| 5,367,393 A | * | 11/1994 | Ohara et al. ................. | 349/111 |
| 5,684,553 A | * | 11/1997 | Fukuchi ....................... | 349/110 |
| 5,922,401 A | * | 7/1999 | Kashiwazaki et al. ...... | 313/479 |
| 5,994,721 A | * | 11/1999 | Zhong et al. ................. | 257/89 |
| 6,130,736 A | * | 10/2000 | Sasaki et al. ................ | 349/122 |
| 6,147,722 A | * | 11/2000 | Shimada et al. ............. | 349/43 |
| 6,162,654 A | * | 12/2000 | Kawabe ....................... | 349/106 |
| 6,208,399 B1 | * | 3/2001 | Ohta et al. ................... | 349/139 |

FOREIGN PATENT DOCUMENTS

| | | |
|---|---|---|
| JP | 4-194823 | 7/1992 |
| JP | 8-122824 | 5/1996 |
| JP | 9-292633 | 11/1997 |
| KR | 1993-4788 | 3/1993 |

* cited by examiner

*Primary Examiner*—Andrew M. Schechter
*Assistant Examiner*—Timothy L. Rude
(74) *Attorney, Agent, or Firm*—McGinn IP Law Group, PLLC

(57) ABSTRACT

The object of the present invention is to provide an active matrix liquid crystal display device having an on-chip color filter structure capable of realizing high precision and a high aperture ratio by making a contact hole small in size without deteriorating productivity.

A liquid crystal display device with an on-chip color filter structure of the present invention has a structure in which a gate insulating layer and a passivation film on a pixel opening portion for forming a color filter is removed and in which the thickness of the color filter for forming a pattern of the color filter on a stepped portion such as a source of a thin film transistor is set smaller than the film thickness of the color filter on the pixel opening portion.

26 Claims, 6 Drawing Sheets

(a)

(b)

(a)

(b)

(a)

(b)

ACTIVE MATRIX LIQUID CRYSTAL DISPLAY WITH 5MM CONTACT HOLE IN COLOR FILTER AND MANUFACTURING METHOD THEREOF

BACKGROUND OF THE INVENTION

1. Field of the Invention

The present invention relates to an active matrix liquid crystal display device and a manufacturing method thereof. The present invention particularly relates to an active matrix liquid crystal display device having a color filter on a substrate on which switching elements are formed and a manufacturing method thereof.

2. Description of the Related Art

In recent years, the development of an active matrix liquid crystal display device (AMLCD) using thin film transistors (TFT) is actively developed. An on-chip color filter structure is reported in the Japanese Patent Application Laid-open No. Hei-8-122824 (to be referred to as "Prior Art 1" hereinafter), 9-292633 (to be referred to as "Prior Art 2" hereinafter) and so on. In the structure, a color filter is fabricated on a substrate on which TFTs are formed (to be referred to as "TFT substrate" hereinafter). It enables to minimize the discrepancy of the position of the color filter to the TFT substrate.

FIGS. 1(a) and 1(b) show the unit pixel area of an AMLCD to which the on-chip color filter structure disclosed by Prior Art 1 is adopted. FIG. 1(a) is a plan view and FIG. 1(b) is a cross-sectional view taken along line A-A' of FIG. 1(a).

A TFT substrate 21 consists of a glass substrate 9, scanning lines 1 formed on the glass substrate 9, for selecting a pixel to which a signal is written, signal lines 2 for supplying a signal voltage and TFTs 3 each for driving a pixel formed at the intersection between a scanning line and a signal line. Among these constituent elements, each TFT 3 is comprised of a gate electrode 12 provided on the glass substrate 9, a gate insulating layer 10 provided to cover the gate electrode 12, a semiconductor layer 24 formed on the gate insulating layer 10, a drain electrode 13, a source electrode 14 and a passivation film 11 provided to cover all the above-stated constituent elements. The scanning line 1 is connected to the gate electrode 12, and the signal line 2 is connected to the drain electrode 13. A color filter 8 and a black matrix 4 are provided on the passivation film 11 and an overcoat layer 19 is further formed to protect the color filter 8 and the black matrix 4. The color filter 8 is formed by coating a pigment dispersion type photosensitive negative resist by spin coating and exposing, developing and sintering the resist. A pixel electrode 7 is provided on the overcoat layer 19 and connected through a contact hole 5 to the source electrode 14 of the TFT. Also, an alignment layer (not shown) for controlling liquid crystal molecules to have an arrangement and an inclination (pre-tilt) suited to the operation mode of liquid crystal is provided on the overcoat layer 19 and the pixel electrode 7. A color filter (CF) substrate 22 has a counter electrode 16 and an alignment layer (not shown) provided on a color filter (CF) glass substrate 15. Further, the TFT substrate 21, the CF substrate 22 and a liquid crystal layer 17 put between the TFT substrates 21 and the CF substrate 22 form a liquid crystal element as a whole. With such an on-chip color filter structure, the color filter and the black matrix are formed on the TFT substrate, thereby making it possible to advantageously reduce the alignment errors of the color filter and the black matrix with respect to pixels caused by misregistration between the TFT substrate 21 and the CF substrate 22.

Here, if the film thickness of the color filter is set at 1.2 µm, that of the gate electrode is set at 0.2 µm, that of the semiconductor layer is set at 0.3 µm, that of the drain electrode is set at 0.2 µm and that of the passivation film is set at 0.3 µm, then the film thickness of the color filter on a contact hole portion is 1.0 µm.

Nevertheless, the negative resist used as a color filter is colored and normally low in sensitivity. Due to this, large exposure is required if the color filter is as thick as 1.0 µm, resulting in the problems that it is difficult to make a device small in size and that productivity is low. Besides, due to the large exposure, residue tends to disadvantageously occur onto the lower elements, i.e., the passivation film and the source electrode after development. Further, while pigments are employed by being dispersed into an acrylic resin, if the sensitivity of this acrylic resin increases, the pigments are hardened only in the vicinity of the surface of the color filter (in a region from 0.3 to 0.5 µm from the surface of the color filter) due to photo-crosslinkage and the shape of the neighborhood of the color filter and that of the contact hole portion are undercut after development. This causes the problems that contact resistance between the pixel electrode and the source electrode increases, adhesion between the color filter and the substrate deteriorates, and the like. That is, in case of the LCD with the on-chip color filter structure according to Prior Art 1, the color filter is thick on the contact hole portion and the neighborhood of the pixels and the photo-crosslinkage of the color filter, therefore, occurs to the surface of the color filter. As a result, this device has disadvantages in that it is difficult to make the device small in size and to improve a aperture ratio as well as productivity is low.

Moreover, with the on-chip color filter structure, in the pigment dispersion type photosensitive negative resist serving as a color filter, a photosensitive acrylic material sensitive to i-rays, g-rays and h-rays is employed as a base resin. As can be seen from the relationship between the film thickness of this high photosensitive color filter resist (e.g., CM-7000 manufactured by Fujifilm Olin Co., Ltd.) and photo-crosslinkability (shown in FIG. 2), the color resist is low in transmittance with respect to i-rays and photo-crosslinkable property suddenly decreases at around 0.3 to 0.5 µm from the surface since the color resist is colored. Normally, the film thickness of the color filter is 0.3 to 0.5 µm. However, if development time is long or over-development occurs for the above-stated reasons, the color filter is isotropically dissolved on the bottom thereof having low photo-crosslinkability and the filter disadvantageously becomes an inverse tapered shape.

SUMMARY OF THE INVENTION

It is, therefore, an object of the present invention to provide an on-chip color filter structure capable of making a device small in size and enhancing an aperture ratio. According to the present invention, a color filter is applied to an on-chip color filter structure by removing a gate insulating layer and a passivation film on a pixel opening portion. Due to this, the color filter on a stepped portion such as the source electrode of a TFT becomes thinner than the color filter on the pixel opening portion and development can be carried out with small exposure. Thus, means for making a device small in size and enhancing an aperture ratio is provided.

According to the first invention, there is provided an AMLCD having a first substrate and a second substrate, at least one of the first and second substrates being transparent; a liquid crystal layer put between the first and second substrates; and a color filter, the first substrate including a plurality of scanning lines, a plurality of signal lines crossing the scanning lines in a matrix manner, a plurality of TFTs formed at intersections of the scanning lines and signal lines, respectively, and pixel electrodes connected to each of the TFTs, the second substrate including a counter electrode, liquid crystal molecules being driven by an electric field between the pixel electrode and the counter electrode to thereby make display, characterized in that the color filter is formed on a passivation film for protecting each of the TFTs; the pixel electrode is arranged on the color filter and connected to the TFTs through a contact hole provided in the passivation film and the color filter; and a gate insulating layer and the passivation film of each of the TFTs are removed in a light transmission region within pixels surrounded by the scanning lines and the signal lines.

According to the second invention, there is provided an AMLCD having a first substrate and a second substrate, at least one of the first and second substrate being transparent; a liquid crystal layer put between the first and second substrate; a color filter; and an overcoat layer protecting the color filter, the first substrate including a plurality of scanning lines, a plurality of signal lines crossing the plurality of scanning lines in a matrix manner, a plurality of TFTs formed at intersections of the scanning lines and the signal lines, respectively, pixel electrodes connected to each of the TFTs, the second substrate including a counter electrode, liquid crystal molecules being driven by an electric field between the pixel electrode and the counter electrode to thereby make display, characterized in that the color filter is formed on a passivation film for protecting each of the TFTs; the overcoat layer is formed on the color filter; the pixel electrode is arranged on the overcoat layer and connected to the TFTs through a contact hole provided in the passivation film, the color filter and the overcoat layer; and a gate insulating layer and the passivation film of each of the TFTs are removed in a light transmission region within pixels surrounded by the scanning lines and the signal lines.

The LCD according to the first or second invention is characterized in that the color filter on the contact hole portion is thinner than the color filter in the light transmission region.

With the on-chip color filter structure of the present invention, the gate insulating layer and the passivation film on a pixel opening portion for forming a color filter are removed, whereby the thickness of the color filter on a stepped portion, such as a source electrode, on which portion the thin film transistor is formed is set smaller than that of the color filter on the opening portion using the flattening property of the color resist. Specifically, if the film thickness of the color filter on the opening portion is 1.2 µm, a total of the thicknesses of the entire films on a stepped portion of the thin film transistor is 1.2 µm, as well, and the thickness of the constituent elements other than the color filter becomes almost 1.0 µm. Thus, the film thickness of the color filter on the stepped portion becomes 0.2 µm. This thickness is sufficient to cause photo-crosslinkage, so that a fine pattern can be formed.

BRIEF DESCRIPTION OF THE DRAWINGS

FIGS. 1(a) and 1(b) show one example of a conventional LCD, wherein FIG. 1(a) is a schematic plan view thereof and FIG. 1(b) is a cross-sectional view of the unit pixel part thereof;

FIGS. 3(a) and 3(b) show a LCD in Embodiment 1 according to the present invention, wherein FIG. 3(a) is a plan view thereof and FIG. 3(b) is a cross-sectional view thereof;

FIGS. 5(a) and 5(b) show a LCD in Embodiment 2 according to the present invention, wherein FIG. 5(a) is a plan view thereof and FIG. 5(b) is a cross-sectional view thereof.

DESCRIPTION OF THE EMBODIMENTS OF THE INVENTION

The preferred embodiments of the present invention will be described hereinafter with reference to the accompanying drawings.

Embodiment 1

Figure 1:
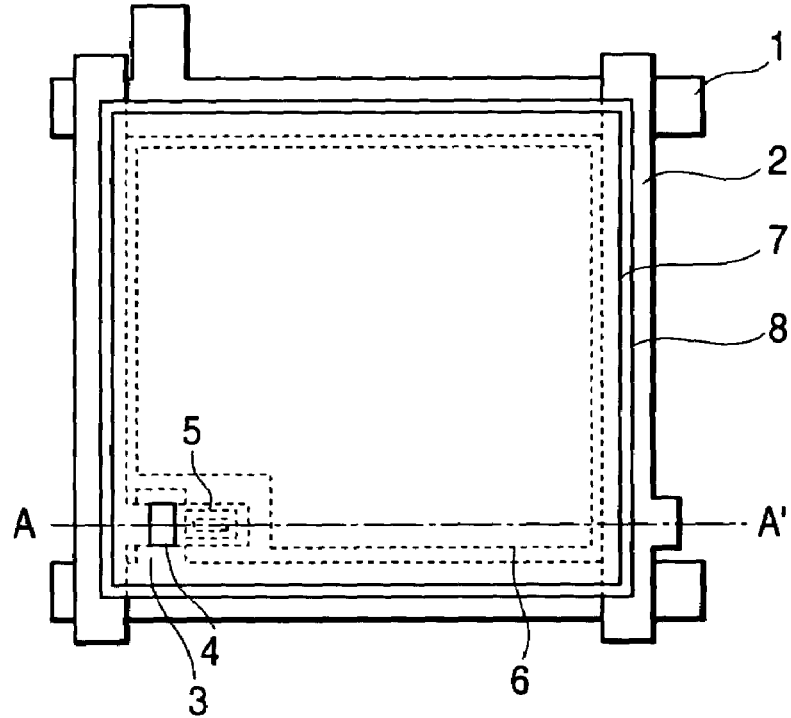
Figure 1:
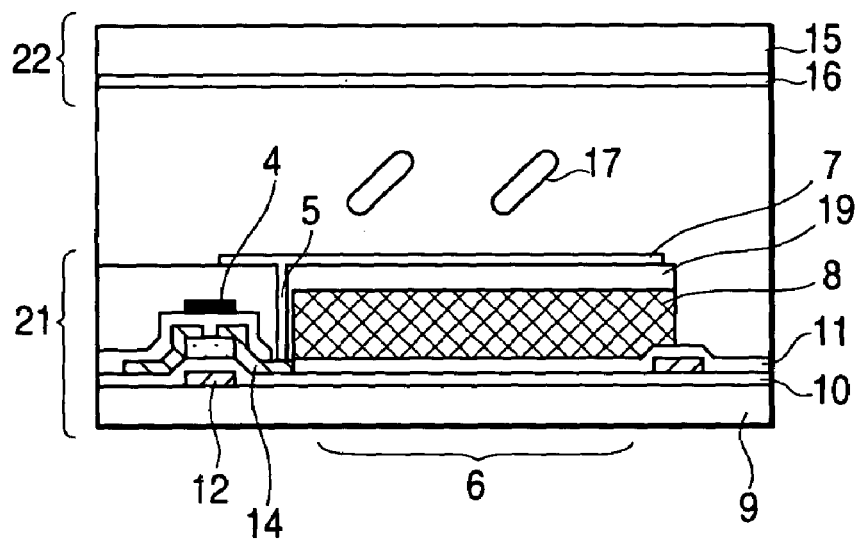
Figure 2:
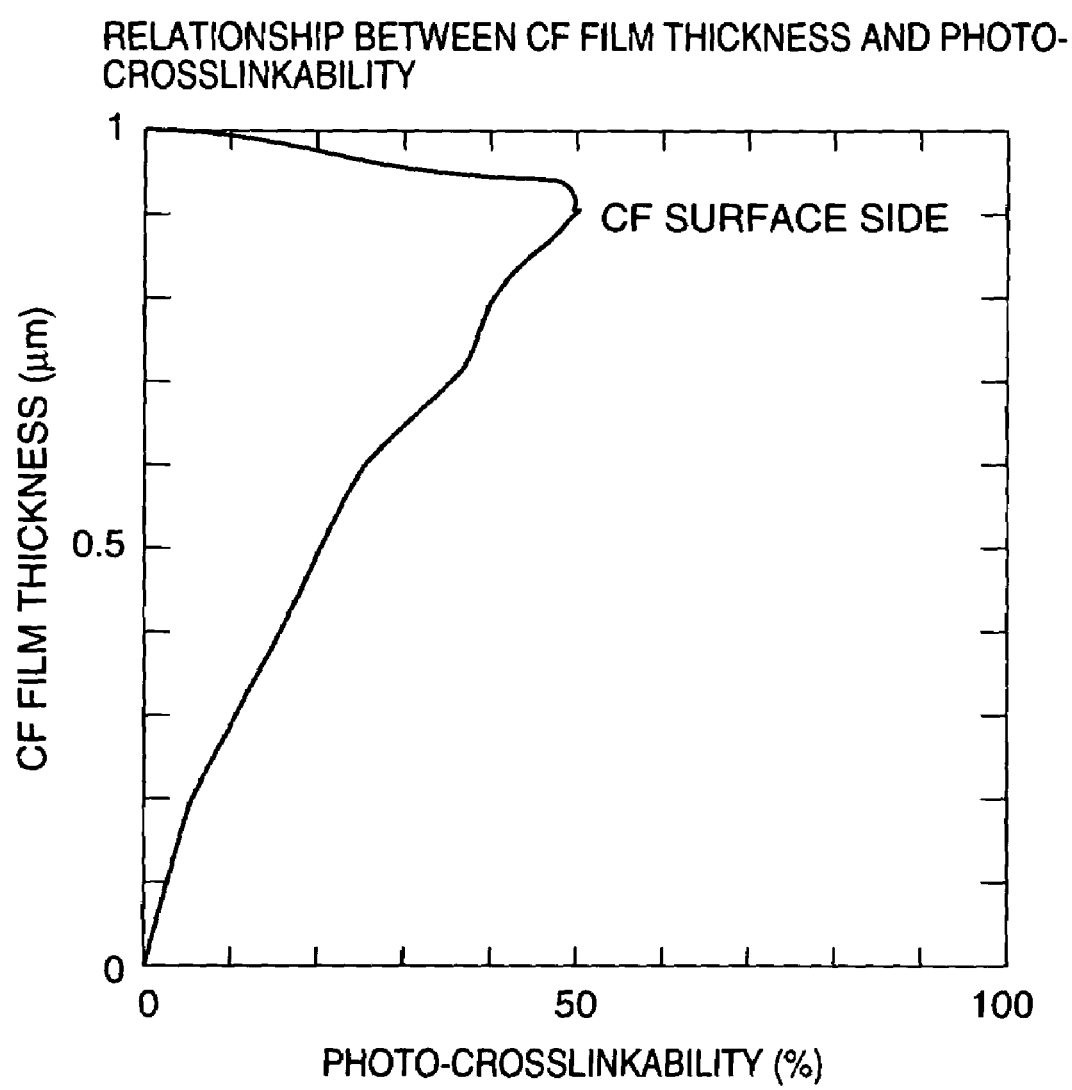
FIG. 2 shows the relationship between the thickness of a color filter (CF) and photo-crosslinkability.
Figure 3:
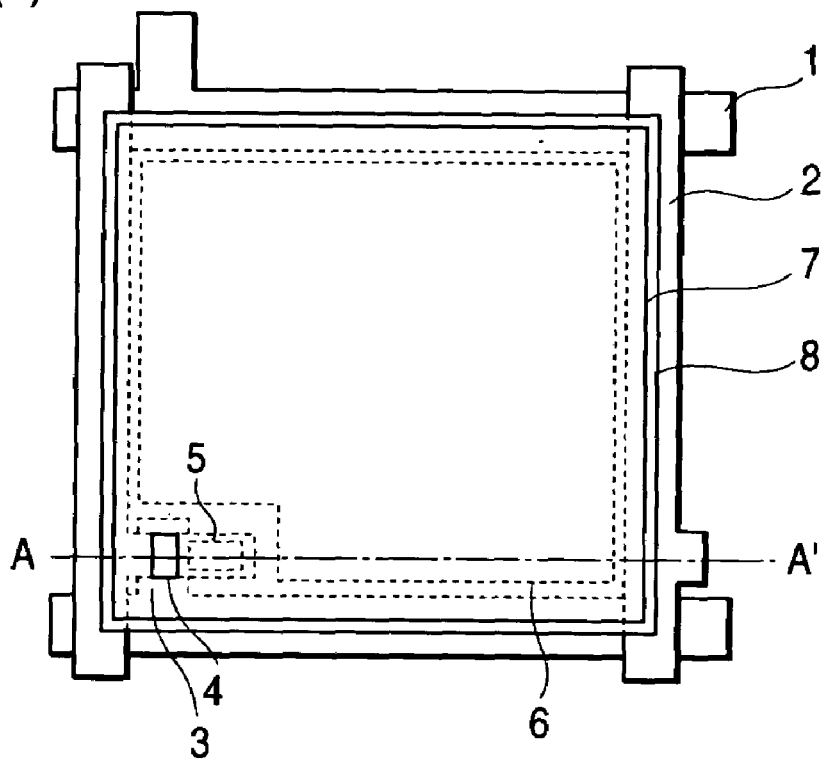
Figure 3:
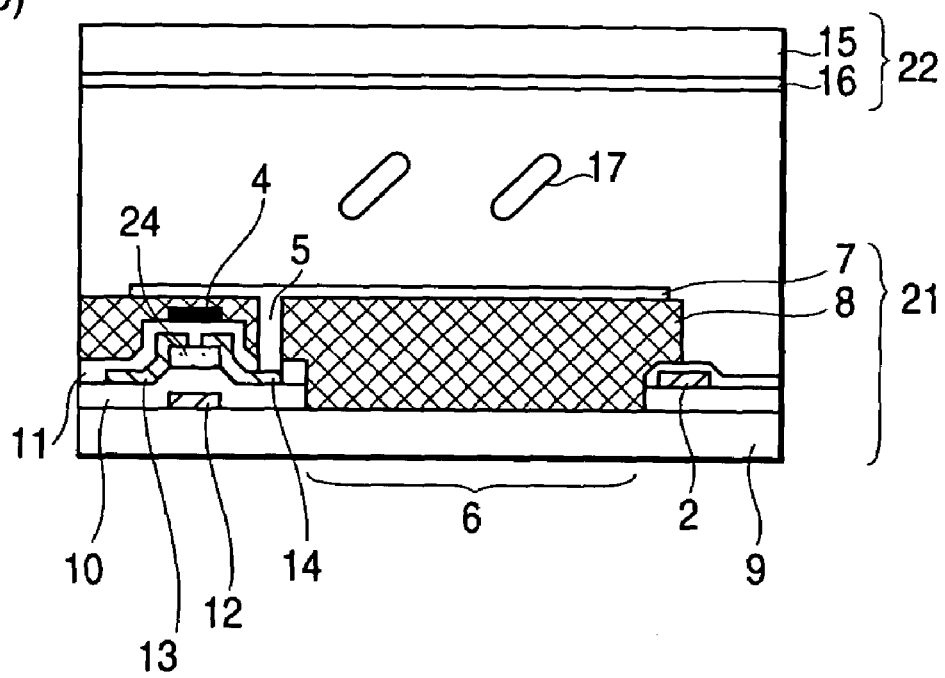

FIGS. 3(a) and 3(b) show the unit pixel part of a LCD having an on-chip color filter structure in this embodiment. Specifically, FIG. 3(a) is a plan view thereof and FIG. 3(b) is a cross-sectional view thereof taken along line A-A' of FIG. 3(a). As shown in FIG. 3(a), a TFT substrate 21 has, on a glass substrate 9, scanning lines 1 each for selecting a pixel to which a signal is written, signal lines 2 each for supplying a to-be-written signal, and TFTs 3 each provided at the intersection between a scanning line and a signal line, for driving a pixel. As shown in FIG. 3(b), each TFT 3 is comprised of a gate electrode 12 provided on the glass substrate 9, a gate insulating layer 10 provided to cover the gate electrode 12, a semiconductor layer 24 formed on the gate insulating layer 10, a drain electrode 13, a source electrode 14 and a passivation film 11 provided to cover the above-stated constituent elements. The scanning line 1 is connected to the gate electrode 12 and the signal line 2 is connected to the drain electrode 13. The passivation film 11 and the gate insulating layer 10 on a pixel opening portion 6 are removed. A color filter 8 and a black matrix 4 are provided on the passivation film 11. A pixel electrode 7 is connected to the source electrode 14 of the TFT 3 through a contact hole provided in the pixel electrode 7. Also, an alignment layer (not shown) for controlling liquid crystal molecules to have an arrangement and an inclination (pre-tilt) suited to the operation mode of liquid crystal is provided on the pixel electrode 7. The film thickness of the gate electrode is set at 0.2 µm, that of the gate insulating layer is set at 0.5 µm, that of the semiconductor layer is set at 0.3 µm, that of the drain electrode is set at 0.2 µm and that of the passivation film is set at 0.3 µm. The thickness of the color filter on the pixel opening portion is set at 1.2 µm so as to secure a sufficient chromaticity range. A counter substrate 22 has a counter electrode 16 and an alignment layer (not shown) provided on a counter glass substrate 15. The TFT substrate 21, the counter substrate 22 and a liquid crystal layer 17 put between the TFT substrates 21 and the counter substrate 22 form one liquid crystal element as a whole. Here, a pigment dispersion type high photosensitive negative resist (such as CM-7000 manufactured by Fujifilm Olin Co., Ltd.) is formed by spin coating. Due to this, even if the lower constituent elements have differences in level, they can be coated with a film having a flat surface. When the negative resist is coated so that the film thickness of the color filter on the pixel opening portion becomes 1.2 µm, the thickness of the color filter on a contact hole formation portion is 0.2 µm and the total thickness on the contact hole formation portion can be reduced by 0.8 µm from that of the conventional thickness since the gate insulating layer has a width of 0.5 µm and the passivation film has a width of 0.3 µm. This makes it possible to set the thickness of the color filter at not more than 0.3 µm with which photo-crosslinkage sufficiently occurs. Thus, it is possible to sufficiently expose the color filter and to realize fine patterning. As a result, the contact hole can be formed in a fine pattern having a diameter of 5 µm.

Figure 4:
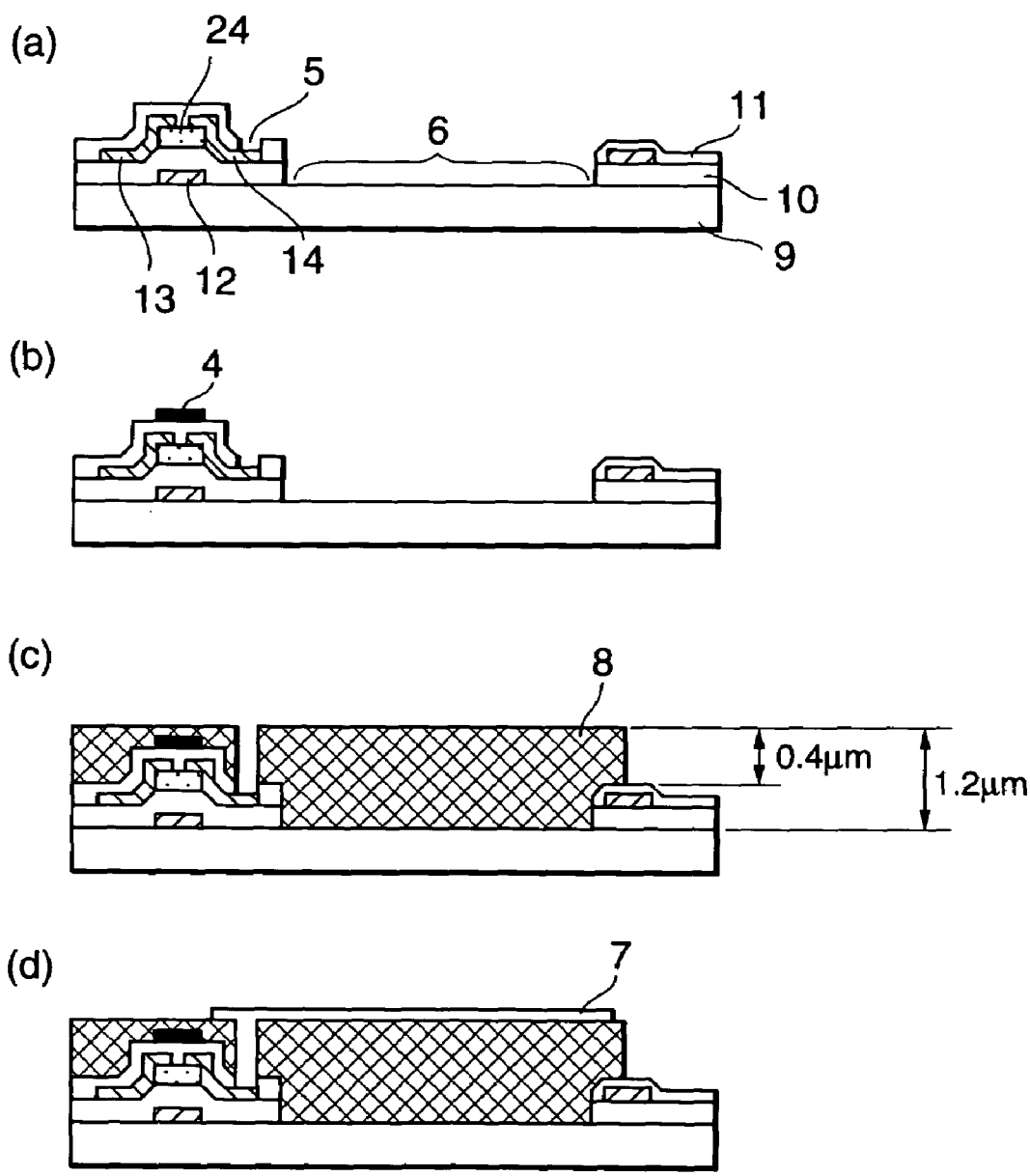
FIGS. 4(a) to (d) shows a method of manufacturing the LCD in Embodiment 1 according to the present invention.

FIG. 4 is an explanatory view for a method of manufacturing an LCD having the on-chip color filter structure in this embodiment.

First, as shown in FIG. 4(a), 0.2 µm of metal such as Cr is formed on the glass substrate 9 and patterned to thereby form a scanning line (not shown) and a gate electrode 12. Next, 0.5 µm of a gate insulating layer 10 and 0.3 µm of a semiconductor layer 24 are formed by the plasma CVD method and the semiconductor layer 24 of the TFT is patterned to have a island structure. Further, 0.2 µm of metal such as Cr is formed and patterned to thereby form a signal line (not shown), a drain electrode 13 and a source electrode 14. Further, 0.3 µm of silicon nitride SiN is formed, as a passivation film 11, by the plasma CVD method. Then, the passivation film 11 and gate insulating layer 10 on a contact hole portion 5 and on a pixel opening portion 6 are removed by dry etching.

Thereafter, as shown in FIG. 4(b), a photosensitive black resist (e.g., CK-S-171 manufactured by Fujifilm Olin Co., Ltd.) into which pigments, titanium oxide and the like are dispersed, is coated and patterned, thereby forming a black matrix 4 by 1 µm on a TFT light shielding portion and a light leakage region.

Next, as shown in FIG. 4(c), an RGB pigment dispersion type resist (e.g., CM-7000 manufactured by Fujifilm Olin Co., Ltd.) is spin-coated and then exposed, developed and sintered to thereby form a color filter 8. In this case, R, G and B pigments are coated by 1.2 µm, respectively. Since spin coating method is used to coat the resist, the color filter 8 coats the lower layers to provide a flat surface even if they have differences in level. Due to this, the thickness of the color filter on the contact hole portion and that of the outline of the color filter pattern become 0.2 µm as stated above. An i-ray stepper is used in exposure to allow the formation of a fine pattern. Since a high photosensitive color resist is used and the film thickness of a pattern formation part is small, it is possible to form the pattern of a contact hole of 5 µm×5 µm with exposure as small as about 100 mJ and to provide an ordinary tapered cross section as desired. Then, development is performed with a 0.12% TMAH (tetramethylammonium (hydro) oxide) solution for 60 to 100 seconds and sintering is performed at 220° C. for one hour.

Finally, as shown in FIG. 4(d), 0.5 µm of indium-tin oxide (ITO) serving as a transparent electrode is formed and patterned to thereby form a pixel electrode 7. After an alignment layer is coated and a rubbing treatment is conducted, the electrode 7 is joined to a counter electrode through a predetermined gap. Liquid crystal is injected into the gap. Thus, an AMLCD is completed.

According to this embodiment, the gate insulating layer and the passivation film on the pixel opening portion are removed, whereby it is possible to make the color filter on the contact portion and on the pattern outline portion thin while maintaining the color filter on the pixel opening portion to be thick, to use a high photosensitive color resist and to form a fine pattern with small exposure. As a result, it is possible to manufacture an LCD having good display quality, high precision and a high aperture ratio.

Embodiment 2

Figure 5:
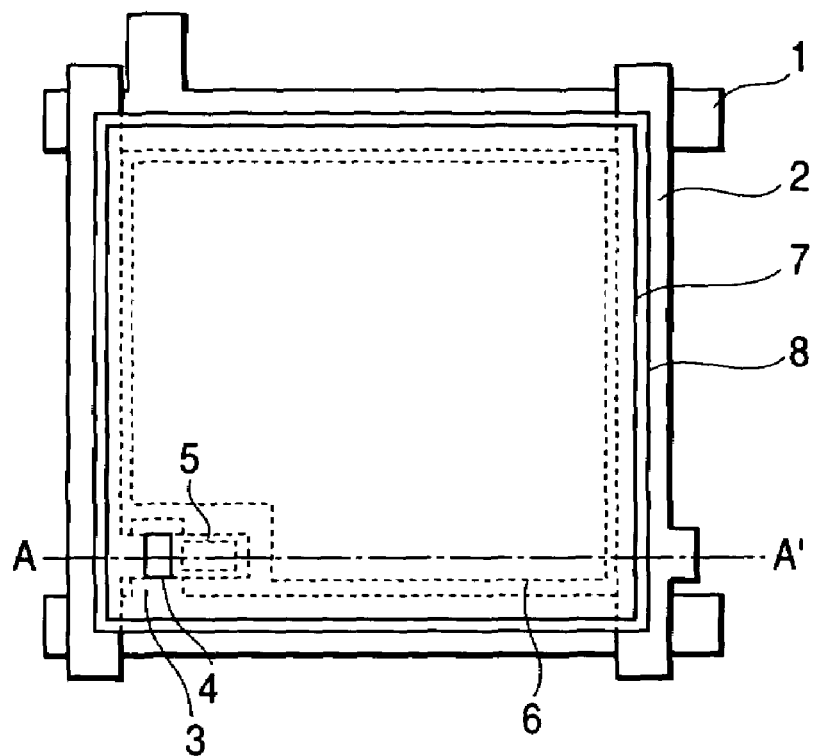
Figure 5:
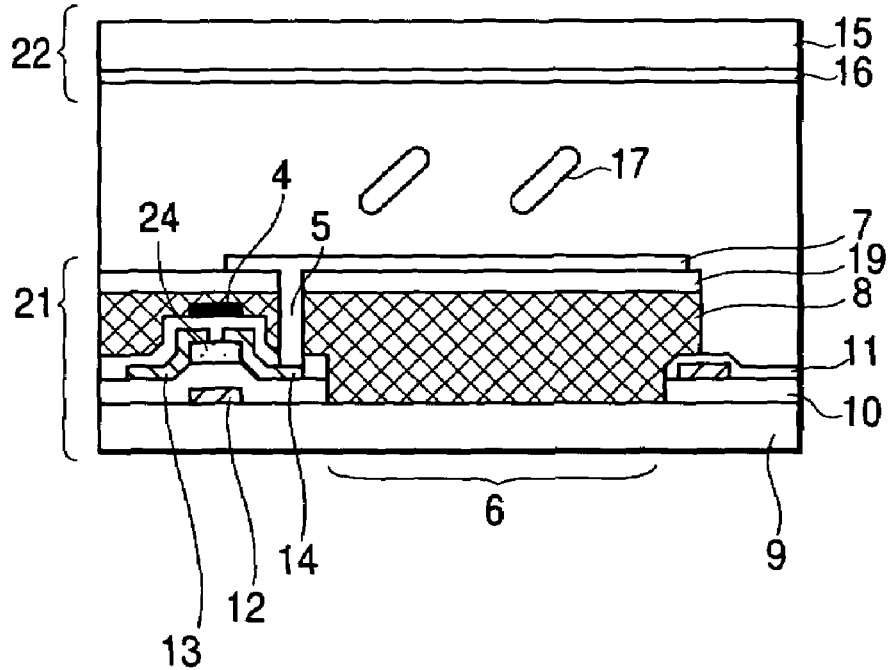

FIGS. 5(a) and (b) show the unit element part of a LCD having an on-chip color filter structure in this embodiment. Specifically, FIG. 5(a) is a plan view thereof and FIG. 5(b) is a cross-sectional view thereof taken along line A-A' of FIG. 5(a). A TFT substrate 21 has, on a glass substrate 9, scanning lines 1 each for selecting a pixel to which a signal is written, signal lines 2 each for supplying a to-be-written signal and TFTs 3 each for driving a pixel at the intersection of a scanning line and a signal line. Each TFT 3 is comprised of a gate electrode 12 provided on the glass substrate 9, a gate insulating layer 10 provided to cover the gate electrode 12, a semiconductor layer 24 formed on the gate insulating layer 10, a drain electrode 13, a source electrode 4 and a passivation film 11 provided to cover the above-stated constituent elements. The scanning line 1 is connected to the gate electrode 12 and the signal line 2 is connected to the drain electrode 13. The passivation film 11 and the gate insulating layer 10 on a pixel opening portion 6 are removed. A color filter 8 and a black matrix 4 are provided on the passivation film 11 and a transparent overcoat layer 19 is provided to protect them. Also, a pixel electrode 7 is connected to the source electrode 14 of the TFT 3 through a contact hole 5 provided in the pixel electrode 7. An alignment layer (not shown) for controlling liquid crystal molecules to have an arrangement and an inclination (pretilt) suited to the operation mode of liquid crystal is provided on the pixel electrode 7. The film thickness of the gate electrode is set at 0.2 µm, that of the gate insulating layer is set at 0.5 µm, that of the semiconductor layer is set at 0.3 µm, that of the drain electrode is set at 0.2 µm and that of the passivation film is set at 0.3 µm. The thickness of the color filter on the pixel opening portion is set at 1.2 µm so as to secure a sufficient chromaticity range. Further, the film thickness of the overcoat layer 19 is set at 0.3 µm. A counter substrate 22 has a counter electrode 16 and an alignment layer (not shown) provided on a counter glass substrate 15. The TFT substrate 21, the counter substrate 22 and a liquid crystal layer 17 put between the TFT substrates 21 and the counter substrate 22 form one liquid crystal element as a whole. Here, the diameter of a contact hole in each of the color filter 8 and the overcoat layer 19 is set at 5 µm×5 µm.

Figure 6:
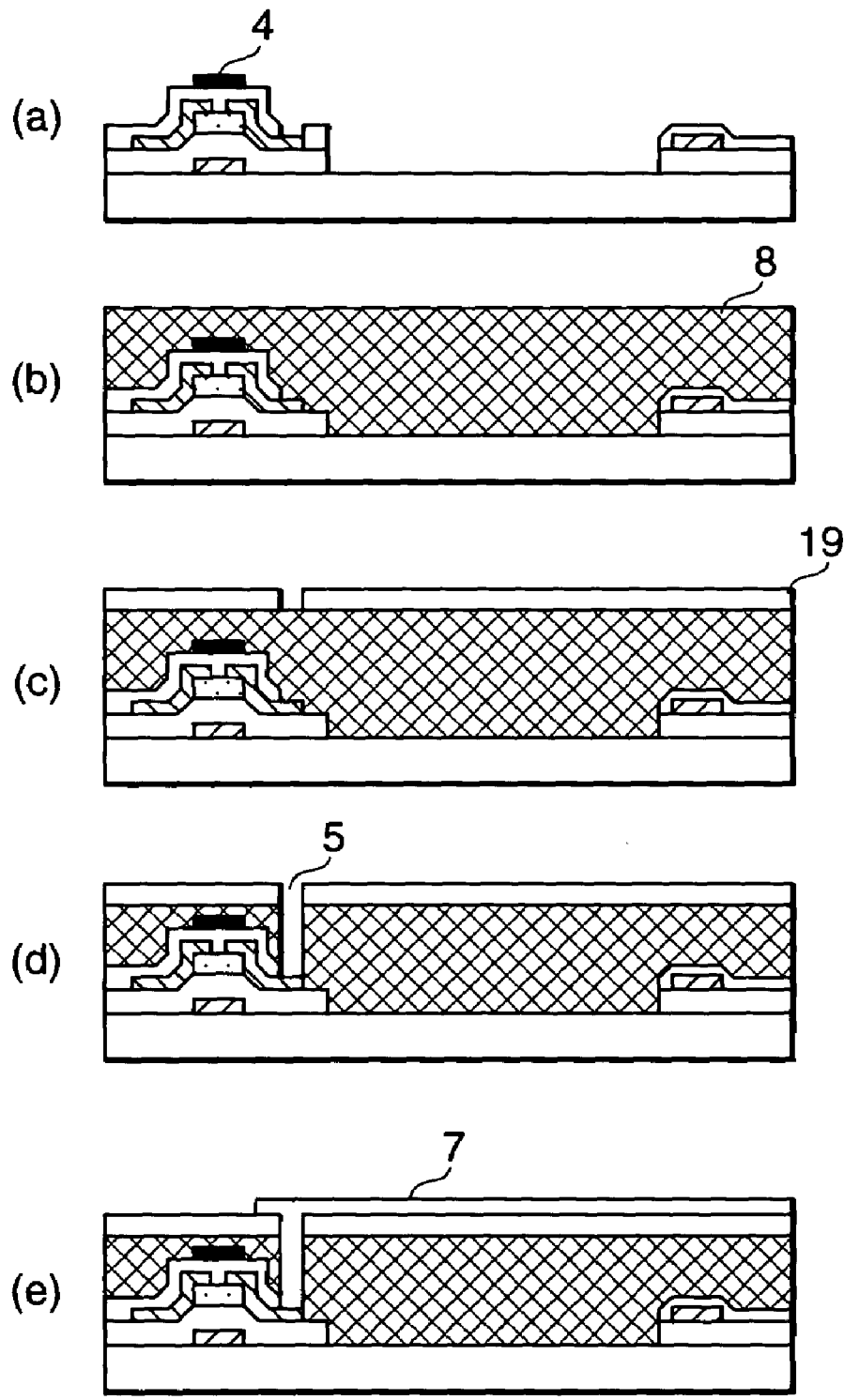
FIGS. 6(a) to (e) shows a method of manufacturing the LCD in Embodiment 2 according to the present invention.

FIG. 6 is an explanatory view for a method of manufacturing a LCD having the on-chip color filter structure in this embodiment. The steps of first forming the scanning line 1, the signal line 2, the TFT 3 and the black matrix 4 on the glass substrate 9 are the same as those in Embodiment 1 (FIG. 6(a)). Next, an RGB pigment dispersion type resist (e.g., CM-7000 manufactured by Fujifilm Olin Co., Ltd.) is spin-coated, exposed, developed and sintered to thereby pattern only a pixel pattern outline portion (FIG. 6(b)). Here, R, G and B pigments are coated by 1.2 µm, respectively. Since the resist is coated by spin coating, the color filter is flattened sufficiently and coats the lower layers to flatten differences in level. Due to this, as described above, the film thickness of the pattern outline portion becomes 0.4 µm. Next, a positive photosensitive acrylic resin (e.g., PC-403 manufactured by JSR) as the overcoat layer 19 is subjected to coating, exposure, development and sintering, and a contact hole if formed (FIG. 6(*c*)). Next, using the overcoat layer 19 as a mask, dry etching is performed with CF4/O2 gas and the pattern of the contact hole 5 is formed on the color resist. Since the thickness of the color resist on the contact portion is as small as 0.4 µm, dry etching processing time is short and the surface of the overcoat layer is not damaged (FIG. 6(*d*)). Finally, 0.05 µm of ITO serving as a transparent electrode is formed and patterned to thereby form a pixel electrode 7 (FIG. 6(*e*)). After an alignment layer (not shown) is coated and a rubbing treatment is conducted, the electrode 7 is joined to a counter electrode through a predetermined gap. Liquid crystal is injected into this gap. Thus, an AMLCD is completed.

This embodiment is characterized by providing an overcoat layer on a color filter to protect the color filter in the LCD having the color filter formed on the TFT substrate. This embodiment is also characterized in that the thickness of the color filter on the contact portion can be made thinner by removing the gate insulating layer and the passivation film on the pixel opening portion and in that a contact hole is formed by dry etching with the overcoat layer used as a mask without damaging the surface of the overcoat layer. With this characteristic constitution, it is possible to form a LCD with higher precision, a higher aperture ratio and better display quality than that in Embodiment 1.

The present invention has advantages in that, in a LCD of an on-chip color filter structure having a color filter provided on a TFT substrate, the thickness of the color filter on the contact hole portion can be made thinner while maintaining the thickness of the color filter in the pixel opening region by removing the gate insulating layer and the passivation film in the pixel opening region and a contact hole of a fine and good shape can be formed by development or dry etching. Besides, the present invention has an advantage of providing a LCD with high precision and a high aperture ratio since the device can be further made smaller in size.

What is claimed is:

1. An active matrix liquid crystal display device, comprising:
    a first substrate and a second substrate, at least one of said first substrate and said second substrate being transparent;
    a plurality of scanning lines formed on said first substrate;
    a plurality of signal lines formed on said first substrate crossing said scanning lines in a matrix manner;
    a plurality of thin film transistors, each said thin film transistor respectively formed at an intersection of said scanning lines and said signal lines, each said thin film transistor comprising:
        a gate electrode formed on said first substrate;
        a gate insulation layer formed on said gate electrode;
        a semiconductor layer formed on said gate insulation layer;
        a drain electrode formed on a first portion of said semiconductor layer and a first portion of said gate insulation layer; and
        a source electrode formed on a second portion of said semiconductor layer and a second portion of said gate insulation layer;
    a passivation film formed on said thin film transistors;
    at least one color filter formed on said first substrate, a color film forming said at least one color filter additionally covering said passivation film;
    a plurality of pixel electrodes, each respectively connected to one of said thin film transistors through a contact hole and each respectively formed on one of said at least one color filter;
    a counter electrode formed on said second substrate; and
    a liquid crystal layer between said first substrate and said second substrate, said liquid crystal layer being driven by electric fields between said pixel electrodes and said counter electrode to thereby make a display,
    wherein said color filter is formed directly on said first substrate in substantially all of a light transmission region within a pixel area surrounded by said scanning lines and said signal lines, a thickness of said color film forming said color filter being a preselected first thickness that provides a sufficient chromaticity for said color filter, and
    said passivation film provides an additional layer over said thin film transistors that reduces a thickness of material of said color filter near said contact hole to a second predetermined thickness chosen to permit a photo-crosslinkage to occur in an entire thickness of said second thickness of said color filter material during an exposure processing for said contact hole to allow a small dimension for said contact hole formed through said color filter material, wherein a width dimension of said contact hole is no more than approximately 5 µm.

2. An active matrix liquid crystal display device according to claim 1,
    wherein said color filter comprises an organic film, a difference in level generated on a surface of the organic film being not more than 0.3 µm.

3. An active matrix liquid crystal display device according to claim 1,
    wherein said color filter comprises a photosensitive acrylic resin having a pigment dispersion property.

4. The active matrix liquid crystal display device of claim 1, wherein said second predetermined thickness being less than approximately 0.4 µm.

5. The active matrix liquid crystal display device of claim 1, wherein said first predetermined thickness is approximately 1.2 µm.

6. The active matrix liquid crystal display device of claim 1, further comprising:
    an overcoat layer between said at least one color filter and said pixel electrodes.

7. The active matrix liquid crystal display device of claim 1, wherein said source electrode is sandwiched between said gate insulation layer and said passivation film, wherein the passivation film completely covers both the source electrode except a portion for connecting to said pixel electrode and gate insulation layer around said source electrode.

8. The active matrix liquid crystal display device of claim 7, wherein an opening penetrating said gate insulation layer and said passivation film is located at said light transmission region, wherein a part of said color filter fills said opening of said gate insulation layer and said passivation film and is formed directly on said first substrate, and other part of said color filter is elongated to cover said thin film transistor.

9. The active matrix liquid crystal display device of claim 7, wherein an edge of said gate insulation layer and an edge of said passivation film at said opening are kept aligned with each other in said light transmission region.

10. The active matrix liquid crystal display device of claim 1, wherein an opening penetrating said gate insulation layer and said passivation film is located at said light transmission region, wherein a part of said color filter fills said opening of said gate insulation layer and said passivation film and is formed directly on said first substrate, and other part of said color filter is elongated to cover said thin film transistor.

11. The active matrix liquid crystal display device of claim 10, wherein an edge of said gate insulation layer and an edge of said passivation film at said opening are kept aligned with each other in said light transmission region.

12. An active matrix liquid crystal display device, comprising:
a first substrate and a second substrate, at least one of said first substrate and said second substrate being transparent;
a plurality of scanning lines formed on said first substrate;
a plurality of signal lines formed on said first substrate crossing said plurality of scanning lines in a matrix manner;
a plurality of thin film transistors, each said thin film transistor formed at each of intersections of said scanning lines and said signal lines, each said thin film transistor comprising:
a gate electrode formed on said first substrate;
a gate insulation layer formed on said gate electrode;
a semiconductor layer formed on said gate insulation layer;
a drain electrode formed on a first portion of said semiconductor layer and a first portion of said gate insulation layer; and
a source electrode formed on a second portion said semiconductor layer and a second portion of said gate insulation layer;
a passivation film formed on said thin film transistors;
at least one color filter formed on said first substrate;
an overcoat layer formed on each of said at least one color filter;
a plurality of pixel electrodes, each respectively connected to one of said thin film transistors through a contact hole;
a counter electrode formed on said second substrate; and
a liquid crystal layer between said first substrate and said second substrate, said liquid crystal layer being driven by an electric field between said pixel electrodes and said counter electrode to thereby make a display,
wherein said at least one color filter is formed directly on said first substrate in most of a light transmission region within a pixel area surrounded by said scanning lines and said signal lines to a first predetermined thickness that provides a sufficient chromaticity for said color filter, said passivation film providing an additional layer that reduces a thickness of material of said color filter near said contact hole such that the reduced thickness of said material allows a dry etching processing of said contact hole without damage to said overcoat layer, wherein a width dimension of said contact hole is no more than approximately 5 μm.

13. An active matrix liquid crystal display device according to claim 12,
wherein the color filter around said contact hole is thinner than the color filter in said light transmission region.

14. An active matrix liquid crystal display device according to claim 12,
wherein said color filter comprises an organic film, a difference in level generated on a surface of the organic film being not more than 0.3 μm.

15. An active matrix liquid crystal display device according to claim 12,
wherein said color filter comprises a photosensitive acrylic resin having a pigment dispersion property.

16. A method of manufacturing an active matrix liquid display device, the method comprising:
forming a plurality of scanning lines on a first substrate;
forming a plurality of signal lines crossing the plurality of scanning lines in a matrix manner;
forming a plurality of thin film transistors, each respectively located at intersections of the plurality of scanning lines and the plurality of signal lines, each said thin film transistor comprising:
a gate electrode formed on said first substrate;
a gate insulation layer formed on said gate electrode;
a semiconductor layer formed on said gate insulation layer;
a drain electrode formed on a first portion of said semiconductor layer and a first portion of said gate insulation layer; and
a source electrode formed on a second portion of said semiconductor layer and a second portion of said gate insulation layer;
forming pixel electrodes respectively connected to each of said thin film transistors;
forming a counter electrode on a second substrate;
injecting a liquid crystal between said first substrate and said second substrate and sealing the liquid crystal,
wherein said method further comprises:
forming a passivation film to provide an extra layer on top of said thin film transistors;
removing said gate insulating layer and said passivation film of each of said thin film transistors in a region surrounded by said signal lines and said scanning lines to expose a surface of said first substrate adjacent to each said thin film transistor;
forming a color filter respectively on said exposed first substrate surface adjacent to each said thin film transistor, a thickness of a color film forming said color filter being a preselected first thickness that provides a sufficient chromaticity for said color filter, said first thickness additionally causing said color film to cover said passivation film on said adjacent thin film transistor to a second thickness, said second thickness permitting a photo-crosslinking of said entire thickness during an exposure process;
forming a contact hole in said color filter and said passivation film on each of said thin film transistors, wherein a width dimension of said contact hole is no more than approximately 5 μm; and
forming said plurality of pixel electrodes, each comprising a transparent conductive film electrically connected through said contact hole.

17. A method of manufacturing an active matrix liquid crystal display, the method comprising:
forming a plurality of scanning lines on a first substrate;
forming a plurality of signal lines crossing the plurality of scanning lines in a matrix manner;
forming a plurality of thin film transistors, each respectively located at intersections of the plurality of scanning lines and the plurality of signal lines, each said thin film transistor comprising:
a gate electrode formed on said first substrate;
a gate insulation layer formed on said gate electrode;
a semiconductor layer formed on said gate insulation layer;

a drain electrode formed on a first portion of said semiconductor layer and a first portion of said gate insulation layer; and a source electrode formed on a second portion of said semiconductor layer and a second portion of said gate insulation layer;

forming a pixel electrode connected to each said thin film transistor;

forming a counter electrode on a second substrate;

injecting a liquid crystal between said first substrate and said second substrate and sealing the liquid crystal;

wherein said method further comprises:

forming a passivation film to provide an extra layer on top of said thin film transistors;

removing said gate insulting layer and said passivation film of each of said thin film transistors in a region surrounded by said signal lines and said scanning lines to expose a surface of said first substrate adjacent to each said thin film transistor;

forming a color filter respectively on said exposed first substrate surface adjacent to each said thin film transistor, a thickness of a color film forming said color filter being a preselected first thickness that provides a sufficient chromaticity for said color filter, said first thickness additionally causing said color film to cover said passivation film on said adjacent thin film transistor to a second thickness;

forming an overcoat layer on said color filter;

patterning said overcoat layer;

forming a contact hole by patterning said color filter while using said overcoat layer as a mask, said second thickness permitting an etching of said contact hole through said color filter material without damaging said overcoat layer, wherein a width dimension of said contact hole is no more than approximately 5 µm; and forming said pixel electrodes, each said pixel electrode comprising a transparent conductive film electrically connected through said contact hole.

18. An active matrix liquid crystal display device, comprising:

a plurality of pixels, each of said pixels comprising:

a transistor;

a passivation film formed to cover said transistor with an additional layer;

a color filter formed to fill a pixel opening adjacent to said transistor, said color filter having a preselected first thickness in said pixel opening to provide a sufficient chromaticity for said color filter, said first thickness additionally causing a color film forming said color filter to cover said passivation film on said adjacent thin film transistor to a second thickness; and a pixel electrode formed to cover said color filter that fills said pixel opening and connected to an electrode of said transistor through a contact hole passing through said passivation film and through said color film covering said passivation film, wherein said second thickness is preselected so that a characteristic of said color film allows said contact hole to be formed in a fine patterning, wherein a width dimension of said contact hole is no more than approximately 5 µm.

19. The device as claimed in claim 18, wherein said characteristic of said color film that allows said fine patterning of said contact hole comprises an amount of cross-linking of said color film that occurs within said second thickness.

20. The device as claimed in claim 19, wherein each of said pixels further comprises:

an overcoat layer inserted between said color filter and said pixel electrode to serve as a mask during formation of said contact hole, wherein said characteristic of said color film that allows said fine patterning of said contact hole comprises an etching rate of said color film such that said second thickness of color film material is etched through to form said contact hole without damage to said overcoat layer by said etching process.

21. The device as claimed in claim 19, wherein each of said pixels further comprises a signal line connected to said transistor, said color filter provided for one of said pixels being extended to and terminated on the signal line connected to an adjacent one of said pixels with an intervention of a part of said passivation film.

22. A method of manufacturing an active matrix liquid crystal display device, the method comprising:

forming a plurality of pixels, said forming of said plurality of pixels comprising, for each of said pixels:

providing a transistor;

forming a passivation film to cover said transistor;

forming a first hole in said passivation film to provide a pixel opening;

forming a color filter to fill said pixel opening, said color filter having a preselected first thickness in said pixel opening to provide a chromaticity for said color filter, said first thickness additionally causing a color film material of said color filter to cover said passivation film covering said transistor with a second thickness;

forming a contact hole through said color film and said passivation covering said transistor to expose an electrode of said transistor, wherein said second thickness allows said contact hole to be formed with a fine pattern due to a characteristic of said color film material, wherein a width dimension of said contact hole is no more than approximately 5 µm; and forming a pixel electrode to cover said color filter and connect to the electrode of said transistor through said contact hole.

23. The method as claimed in claim 22, wherein said characteristic comprises a photo-crosslinking characteristic, said second thickness allowing sufficient photo-crosslinking to occur for said fine patterning of said contact hole forming.

24. The method as claimed in claim 23, further comprising:

for each of said pixels, inserting an overcoat layer between said color filter and said pixel electrode to serve as a mask for said contact hole forming, wherein said characteristic of said color film that allows said fine patterning of said contact hole comprises an etching rate of said color film such that said second thickness of color film material is etched through to form said contact hole without damage to said overcoat layer by said etching process.

25. The method as claimed in claim 23, further comprising, for each of said pixels, providing a signal line connected to said transistor, said color filter provided for one of said pixels being extended to and terminated on the signal line connected to an adjacent one of said pixels with an intervention of a part of said passivation film.

26. The method of claim 22, wherein said first thickness is approximately 1.2 µm and said second thickness is no more than approximately 0.3 µm.

* * * * *